(12) United States Patent
Ferra et al.

(10) Patent No.: US 7,503,748 B2
(45) Date of Patent: Mar. 17, 2009

(54) MOUNTING ARRANGEMENT FOR TURBINE BLADES

(75) Inventors: Paul W. Ferra, Derby (GB); John A. Mylemans, Derby (GB)

(73) Assignee: Rolls-Royce, PLC, London (GB)

( * ) Notice: Subject to any disclaimer, the term of this patent is extended or adjusted under 35 U.S.C. 154(b) by 691 days.

(21) Appl. No.: 11/068,912

(22) Filed: Mar. 2, 2005

(65) Prior Publication Data
US 2005/0201857 A1 Sep. 15, 2005

(30) Foreign Application Priority Data
Mar. 13, 2004 (GB) ................... 0405679.2

(51) Int. Cl.
*F01D 5/08* (2006.01)
(52) U.S. Cl. .................... 416/97 R; 415/115
(58) Field of Classification Search ................ 415/115; 416/97 R, 193 A, 248
See application file for complete search history.

(56) References Cited

U.S. PATENT DOCUMENTS

| 3,663,118 | A | | 5/1972 | Johnson |
| 3,768,924 | A | * | 10/1973 | Corsmeier et al. ........... 416/95 |
| 4,457,668 | A | | 7/1984 | Halligner et al. |
| 5,281,097 | A | * | 1/1994 | Wilson et al. ........... 416/193 A |
| 5,388,962 | A | * | 2/1995 | Wygle et al. ................... 416/95 |
| 5,800,124 | A | * | 9/1998 | Zelesky ....................... 416/95 |
| 5,951,250 | A | | 9/1999 | Suenaga et al. |
| 5,984,636 | A | * | 11/1999 | Fahndrich et al. ......... 416/96 R |
| 6,065,932 | A | * | 5/2000 | Dodd ....................... 416/97 R |
| 6,331,097 | B1 | * | 12/2001 | Jendrix ..................... 416/96 R |
| 6,595,741 | B2 | * | 7/2003 | Briesenick et al. .......... 415/116 |
| 7,192,245 | B2 | * | 3/2007 | Djeridane et al. ........... 415/115 |
| 2002/0159880 | A1 | | 10/2002 | Morris et al. |

FOREIGN PATENT DOCUMENTS

GB 701263 12/1953

* cited by examiner

*Primary Examiner*—Ninh H Nguyen
(74) *Attorney, Agent, or Firm*—Oliff & Berridge, PLC

(57) ABSTRACT

A mounting arrangement 31 incorporates a blade pocket cavity 35, 135, 235 between a blade platform 34, 134, 234 and a rotor disc post 53. Coolant air is presented within the cavity 35, 135, 235 in order to provide cooling of the platform 34, 134, 234. In order to inhibit ingress of hot air from adjacent wheel spaces 36, an air curtain is created across an open end 45, 145 whereby coolant air is contained within the cavity 35, 135, 235. Air flow from the air curtain itself may pass along a surface 48, 148 to provide more direct cooling for the platform 34, 134, 234. Apertures 49, 50 may be provided in order to bleed coolant air from the cavity 35 and also draw an air flow 51 across the surface 48 for greater cooling efficiency.

17 Claims, 5 Drawing Sheets

MOUNTING ARRANGEMENT FOR TURBINE BLADES

The present invention relates to mounting arrangements for turbine blades in an engine and more particularly to providing an arrangement for more effective cooling of blade platform portions.

Operation of turbine engines is well known in order to provide propulsion for aircraft.

Referring to FIG. 1, a gas turbine engine is generally indicated at 10 and comprises, in axial flow series, an air intake 11, a propulsive fan 12, an intermediate pressure compressor 13, a high pressure compressor 14, a combustor 15, a turbine arrangement comprising a high pressure turbine 16, an intermediate pressure turbine 17 and a low pressure turbine 18, and an exhaust nozzle 19.

The gas turbine engine 10 operates in a conventional manner so that air entering the intake 11 is accelerated by the fan 12 which produce two air flows: a first air flow into the intermediate pressure compressor 13 and a second air flow which provides propulsive thrust. The intermediate pressure compressor compresses the air flow directed into it before delivering that air to the high pressure compressor 14 where further compression takes place.

The compressed air exhausted from the high pressure compressor 14 is directed into the combustor 15 where it is mixed with fuel and the mixture combusted. The resultant hot combustion products then expand through, and thereby drive, the high, intermediate and low pressure turbines 16, 17 and 18 before being exhausted through the nozzle 19 to provide additional propulsive thrust. The high, intermediate and low pressure turbines 16, 17 and 18 respectively drive the high and intermediate pressure compressors 14 and 13 and the fan 12 by suitable interconnecting shafts.

The present invention in particular relates to mounting arrangements for turbine blades in order to provide more efficient cooling for blade platforms.

FIG. 2 is a schematic perspective view of a prior nozzle guide vane and turbine blade cooling arrangement. The present invention particularly relates to mounting arrangements for turbine blades 118. As can be seen, high pressure coolant air 100 passes through apertures 101 and pre-swirler nozzles 102 into a plenum chamber 103 where it is distributed to root galleries 104 at the base of each blade 118. This coolant air also circulates into blade pockets 105 formed between adjacent blades 118 in order to provide some additional cooling of blades via cooling passage 120 below the blade platform 106. It will also be understood that coolant air 107, 108, 109 is presented through apertures in guide nozzles 110 and the blades 118 in order to provide surface cooling for these components.

High engine thermal efficiency is dependent upon high turbine entry temperatures which in turn are limited by the material properties of the turbine blades and nozzle guide vane materials. It is for these reasons that cooling is provided within a turbine engine. Typically, in order to achieve cooling, multi-pass coolant systems are provided in which coolant air flows are controlled and regulated through passageways, apertures and nozzles in order to maximize the cooling effect. For example, the pre swirler nozzles 102 act to reduce temperature and pressure of the cooling air flow 100 as it is presented to the rotor disc assembly for cooling purposes.

A particular problem relates to the space, commonly referred to as the wheel space, in front of each rotor disc assembly upon which turbine blades are secured. In short, the air within these spaces has tended to be warmed and is of lower cooling quality due to passing through a rotor stator cavity where it has been exposed to windage and drag from the static components adjacent to the rotor disc. It will be understood for cooling efficiency, it is desirable for there to be a positive flow of relatively cool air. Unfortunately, in some previous arrangements for cooling the blade platform 106, air has been taken from these fore and aft wheel spaces with the result that inefficient cooling has occurred. It will be understood in engines where there is no cooling passage, ingress of air from the relatively hot spaces in front of the blade pocket 105 and its substantial retention and re-circulation within that pocket 105 contributes significantly to high disc 111 temperatures which in turn may reduce effective operational component lives in the engine or limit acceptable gas path temperature to achieve required component life.

In order to avoid this particular problem, previous solutions have included adding mechanical features to the front and rear of the disc 111 in order to effectively seal the blade pocket 105 from ingress of the relatively hot wheel space air whilst providing a separate supply of cooling air to cool the blade platform and disc 111 itself. Nevertheless, it will still be appreciated that problems can still arise with high temperatures in the blade pocket 105 leading to higher operating temperatures and restrictions on engine efficiency or limited component life. Furthermore, such mechanical features added to design and assembly complexities. It is also known to purge the wheel space with cool air but this is a relatively wasteful approach in terms of cooling effect upon the hottest components for volume of coolant air used.

In accordance with the present invention there is provided a mounting arrangement for a turbine engine blade in an engine, the arrangement comprising a blade associated with a rotor disc assembly with a cavity between them, the cavity having an open end, the arrangement characterized in that a surface of the rotor disc assembly which extends from the open end includes entrainment features to direct a curtain airflow across the open end to create in use effective coolant air containment within the cavity.

Typically, the entrainment features comprise striations or slots or grooves formed in the surface. Normally, the entrainment features are integral with the surface. Generally, the entrainment features extend from a coolant plenum chamber within the rotor disc assembly to the open end of the cavity. Possibly, the entrainment features are angled to utilize rotary effects present in operation.

Typically, the surface is part of a wheel space to one side of the rotor disc assembly.

Typically, a primary coolant airflow passes through a root gallery into the cavity.

Preferably, the cavity includes bleed apertures 50 to facilitate throughput of coolant air flows within the cavity. Normally, the bleed apertures are at an opposite end of the cavity to the open end in order to draw the curtain flow as a coolant air flow across a cavity surface therebetween. Generally, the bleed apertures are configured and/or positioned in order to optimize the throughput of air flows through the cavity for cooling effect.

The cooling of the blade platform and throughput of air maintains acceptable blade platform and disc temperatures.

Preferably, the entrainment features are tapered in a radially outward direction and they are part circular in cross-section.

Alternatively, the entrainment features are defined by at least two substantially flat surfaces.

Preferably, the entrainment features do not break out of the radially outer edge of their defining surface.

Alternatively, the entrainment features break out of the radially outer edge of their defining surface.

Also in accordance with the present invention there is provided a turbine engine incorporating a mounting arrangement as described above.

An embodiment of the present invention will now be described by way of example and with reference to the accompanying drawings in which:—

Figure 1:
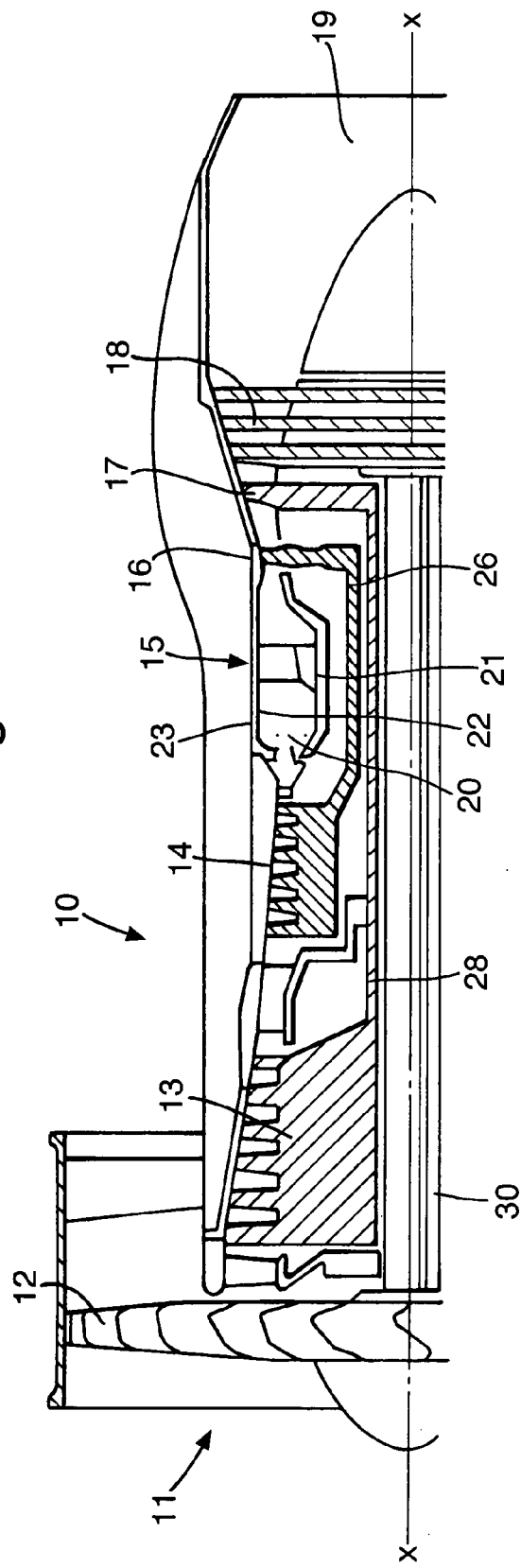
FIG. 1 illustrates a gas turbine engine.
Figure 2:
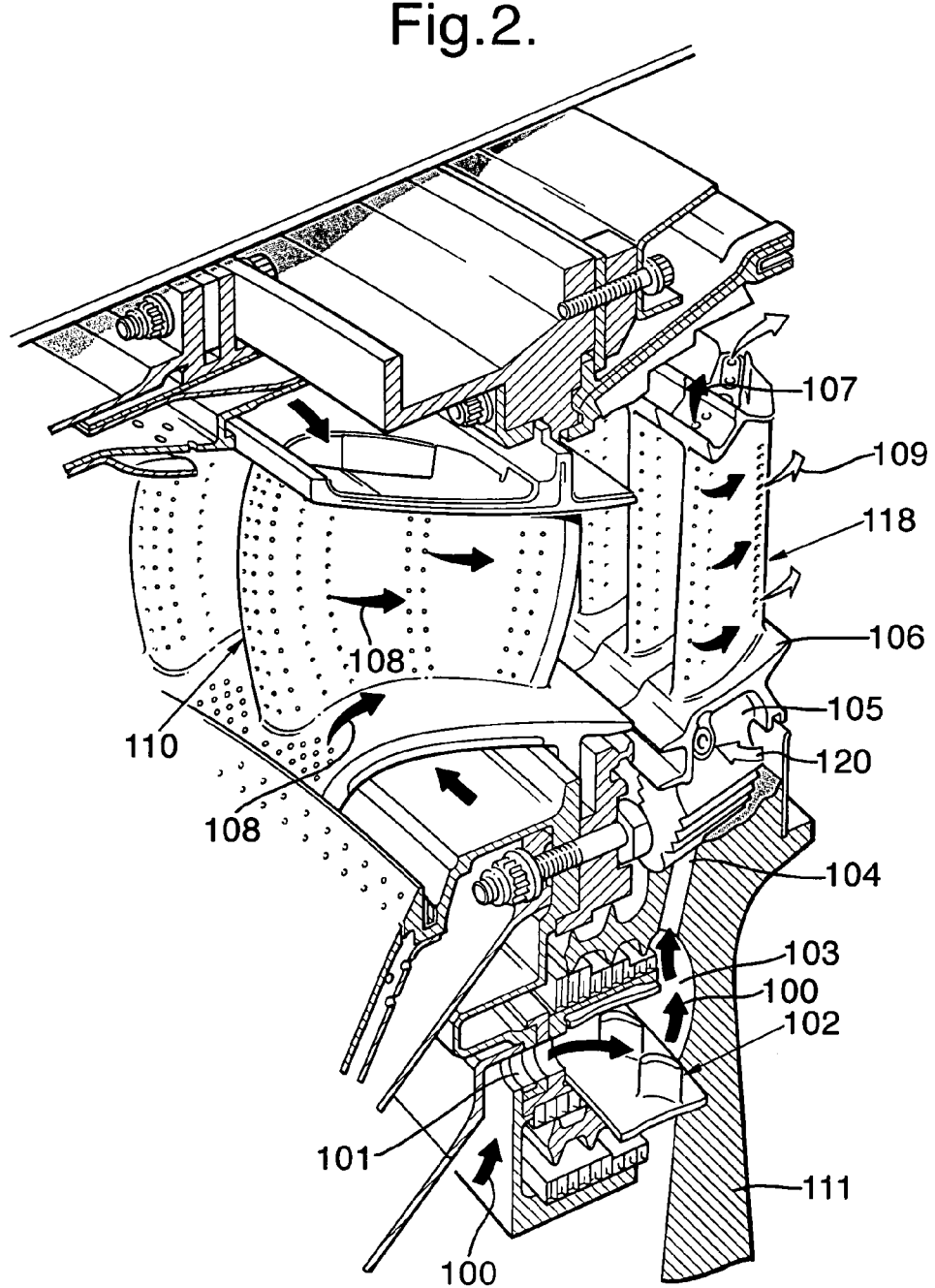
FIG. 2 is a schematic perspective view of a nozzle guide vane and turbine blade cooling arrangement.
Figure 3:
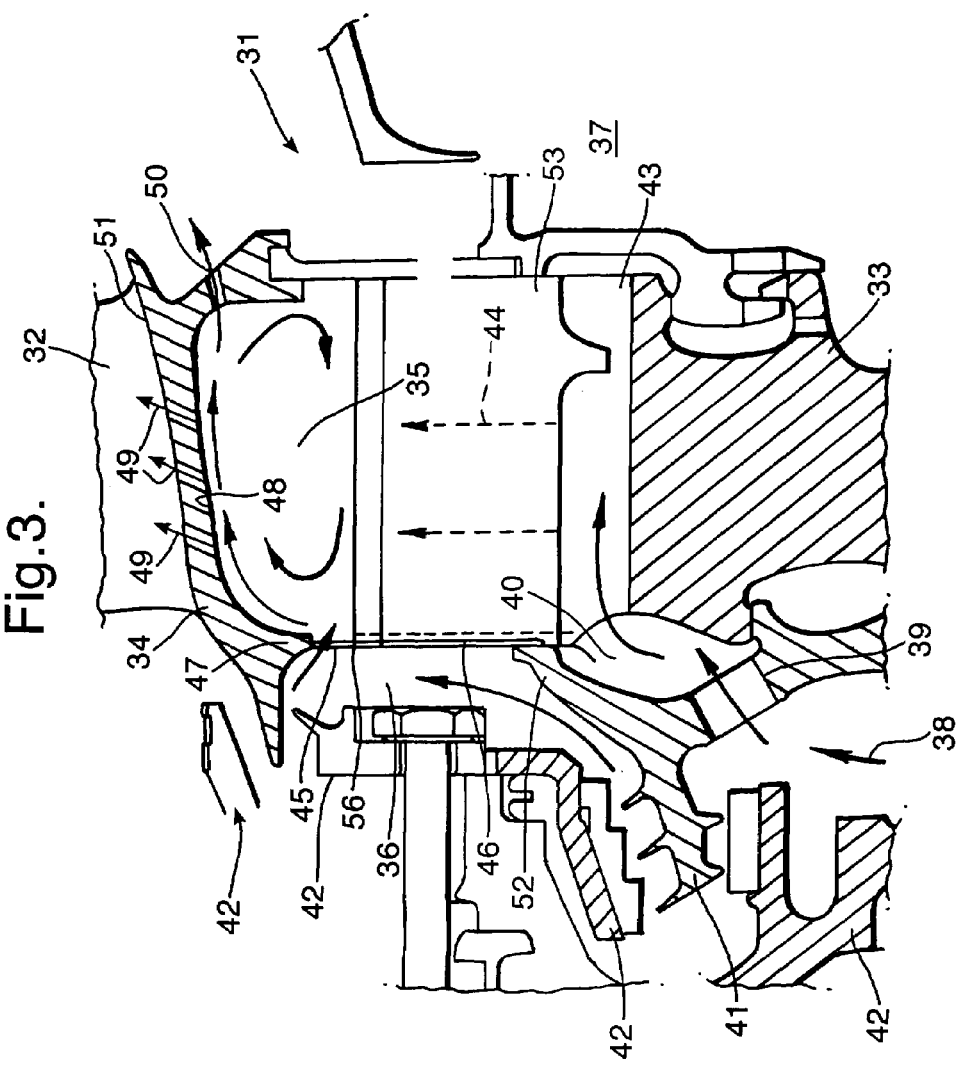
FIG. 3 is a schematic cross section illustrating a mounting arrangement for a turbine blade.

Referring to FIG. 3 illustrating a cross-section of a mounting arrangement 31 in accordance with the present invention. The arrangement 31 comprises a turbine blade 32 associated with a rotor disc 33 with appropriate seals and couplings to ensure location. Typically, the turbine blade 32 is secured through a fir tree or other connection to ensure retention upon the disc 33 when rotated. The present invention in particular relates to providing cooling to a blade platform section 34 through a blade pocket cavity 35. Either side of the mounting arrangement there are wheel spaces 36, 37 which as indicated previously generally are filled with air less acceptable for cooling purposes due to lower rotational velocity relative to the disc assembly and which is subjected to significant heating by the associated static components and surfaces about these wheel spaces 36, 37. In accordance with the present invention this volume of relatively stagnant but hot air in the wheel spaces 36, 37 is prevented from entering the blade cavity. Thus, coolant air passes through a pre swirler nozzle (not shown) in the direction of arrowhead 38 through an aperture 39 into a plenum chamber 40. This plenum chamber 40 generally is formed as a distribution reservoir about the whole rotor disc 33/blade 32 assembly, which it will be appreciated in practice will comprise a large number of blades 32 secured to the rotor disc 33.

It will be noted that a labyrinth seal 41 is provided between the rotating disc 33 with blades 32 and the static engine structures 42 such that the coolant air flow 38 does not leak into the wheel space 36 directly.

It is more effective utilization of this coolant airflow 38 which achieves the higher cooling efficiency of the present arrangement 31. It will be understood previously this coolant airflow has been less efficient hotter air from the wheel spaces 36, 37 through an open end 45 of the blade pocket cavity 35. Entry or purging of such hotter wheel space 36, 37 air into the blade cavity is at least inhibited by the created air curtain across the opening.

In accordance with the present invention a surface 46 extends from the open end 45 to the plenum chamber 40. This surface 46 includes entrainment features such as striations or slots or grooves whereby a proportion of the coolant air flow 38 entering the plenum chamber 40 is entrained by these features. In such circumstances, this proportion of the coolant air flow 38 is presented across the open end 45 in order to create an air curtain essentially isolating and separating the cavity 35 whereby there is limited if any dilution of the coolant air within the cavity 35 presented from the wheel space 36. Typically, an edge 56 of the open end 45 is configured in order to provide a desired launch orientation for the air curtain created across the open end 45. A receiving edge 47 of the open end 45 may be shaped in order to receive or scoop the air curtain and direct at least a portion of it along a cavity surface 48 for cooling of that surface 48 and therefore the platform 34.

In order to achieve good cooling efficiency it will be understood that coolant air within the cavity 35 will be bled off in order to be replaced with cooler air drawn along the grooves in the surface 46. In such circumstances, bleed apertures in the form of micro-apertures 49 in the platform 34 and/or a sink aperture 50 are provided. The micro apertures 49 essentially draw coolant air flow 51 taken from the air curtain flow presented across the open end 45. Similarly, the sink aperture 50 draws that air flow 51 for cooling effect maintenance through bleed and replenishment with further coolant air from the plenum 40. It will be understood that the relative sizes of the micro apertures 49 and sink aperture 50 will be determined by particular mounting arrangement requirements relative to coolant air flow rates and desired operating temperatures and efficiencies.

As indicated above, it is the air curtain created by air flows along the entrainment features of the surface 46 which ensures containment of the coolant air within the cavity 35. Initially, as illustrated the entrainment features in the form of slots or grooves in the surface 46 traverse a portion of a retainer cover plate 52, so there is a degree of jetting of the air flow through the entrainment grooves or slots. This initial jet entrainment may be further enhanced by shaping of the entrainment grooves or slots to utilize centrifugal or other rotational force as well as through structural shaping of the grooves or slots to ensure an adequate air curtain is presented across the open end 45 of the cavity 35. Such structural shaping may include angular orientation of the grooves or slots and varying cross-sectional geometry along their length.

At the projection edge 46, the entrainment features in the form of grooves or slots may again be shaped and angled to facilitate more forceful jetting across the open end 45 for a greater efficiency with respect to forming a containment air curtain for the cavity 35. Typically, the receiving edge 47 will be shaped and angled to act as a guide scoop for the air curtain projected across the open end 45 to facilitate air flow along the cavity surface 48. This air flow is further stimulated by bleed drawing through the micro apertures 49 and the sink aperture 50. The specific sizes, shapes and distribution of the entrainment feature as slots or grooves, edges 45, 47 and apertures 49, 50 will be chosen dependent upon operational mounting arrangement configurations and desired performance.

As indicated above, a proportion of the coolant air within the cavity 35 will be bled off for regenerative purposes. Nevertheless coolant air will be retained and linger within the cavity 35. Generally, it is necessary that the presentation pressure of the air curtain created through the air flow across the open end 45 is greater than the stable coolant pressure within the cavity 35 and wheel space 36. With regard to the cavity 35 it will be appreciated that the coolant air flow across the open end 45 is substantially directly presented from the plenum chamber 40 through the entrainment slots or grooves in the surface 46. In such circumstances, the direct air flow through the entrainment grooves of the surface 46 forming the air curtain across the open end 45 will generally be more forceful than the retained coolant air within the chamber 35. With regard to the wheel space 36, it will be appreciated as described previously that this space 36 is relatively stagnant due to the drag imposed on the air by the static components 42 and the labyrinth seal 41 and so will generally not present too great a penetrative pressure to force entry across the air curtain created by the coolant air flow through the entrainment grooves or slots in the surface 46.

In addition to providing a greater cooling effect, the apertures 49, 50 may be angled against the direction of rotation for the disc 33 in order to recover useful energy from the coolant air as it expands into the general turbine gas path of an engine. Such configuration of the apertures 49, 50 will reduce the detrimental performance impacts associated with using cooling air at these locations.

Figure 4:
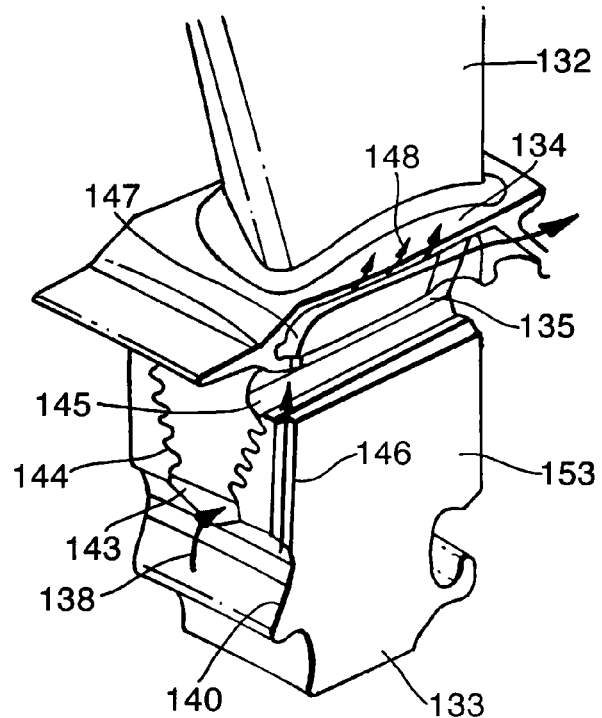
FIG. 4 is a front perspective view of a mounting arrangement.

FIG. 4 is a front perspective view of a mounting arrangement in accordance with the present invention with the retainer cover plate removed, similar reference numerals have been used for consistency of description but incremented by 100 from FIG. 3. Thus, a rotor disc 133 includes an indented plenum chamber portion 140 which will form part of the plenum chamber in association with a retainer cover plate (not shown). The coolant air flow 138 will pass into the thus formed plenum chamber such that a proportion enters the root gallery 143 for movement through passageways (not shown) into the blade. In accordance with the present invention, entrainment slots 146 are provided which extend directly upwards to an open end 145 of a cavity 135. As generally indicated previously, the proportion of the air flow 138 which passes through the grooves 146 creates an air curtain at the open end 145 essentially containing coolant air within the cavity 135 for cooling efficiency with respect to a blade platform 134 as well as the disc 153 outer edge. An edge 147 is configured to receive the proportion of air flow 138 through the grooves 146 in order that this flow is drawn along a cavity surface 148 of the platform 134 for greater cooling efficiency.

Figure 5:
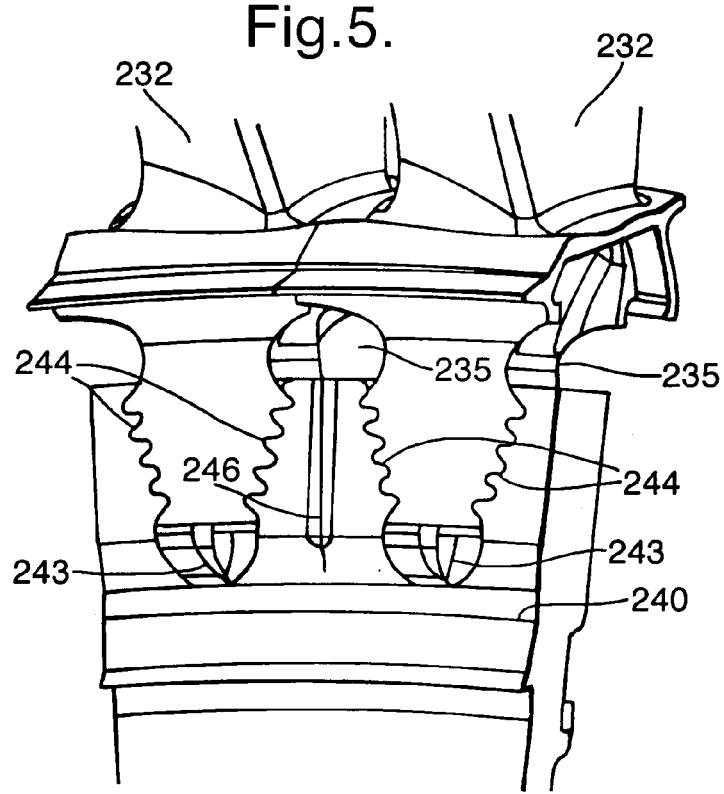
FIG. 5 is a cross section illustrating two mounting arrangements side by side; and, FIG. 6 is a front perspective view of a mounting arrangement.

FIG. 5 provides a front view illustrating two mounting arrangements in accordance with the present invention side by side. Similar reference numerals have been used for description consistency but incremented by 200 from FIG. 3. Thus, a plenum chamber is formed between plenum indentation 240 and a retainer cover plate (not shown). This plenum chamber extends into root galleries 243 which extend below blades 232 such that coolant air flow passes through passages 244 in order to provide coolant air for blade cooling. In accordance with the present invention entrainment slots or grooves 246 extend from the plenum indentation 240 upwards to the cavity 235 in order to create an air curtain which encapsulates and contains the coolant air within the cavity 235. As generally indicated previously this air curtain passes along an interior surface of the cavity 235 for greater cooling effect. The distribution, size and cross-sectional dimensions of the entrainment slots or grooves will be chosen in order to achieve the greatest efficiency in forming an appropriate air curtain for containment of the cavity 235 as well as the cooling effect within the cavity 235. It should be understood that the air flow through the entrainment slots or grooves principally prevents ingress of hotter air in a wheel space in front of the open end of the cavity 235 and provides cooling air to the cavity. This cooling air may supplement cooling air presented by other means from the root gallery 243 to the cavity 235. Although not illustrated in FIG. 5 but described previously, apertures were normally provided within the cavity 235 to bleed or draw coolant air for cavity cooling air regenerative purposes to improve cooling efficiency within the cavity 235.

Figure 6:
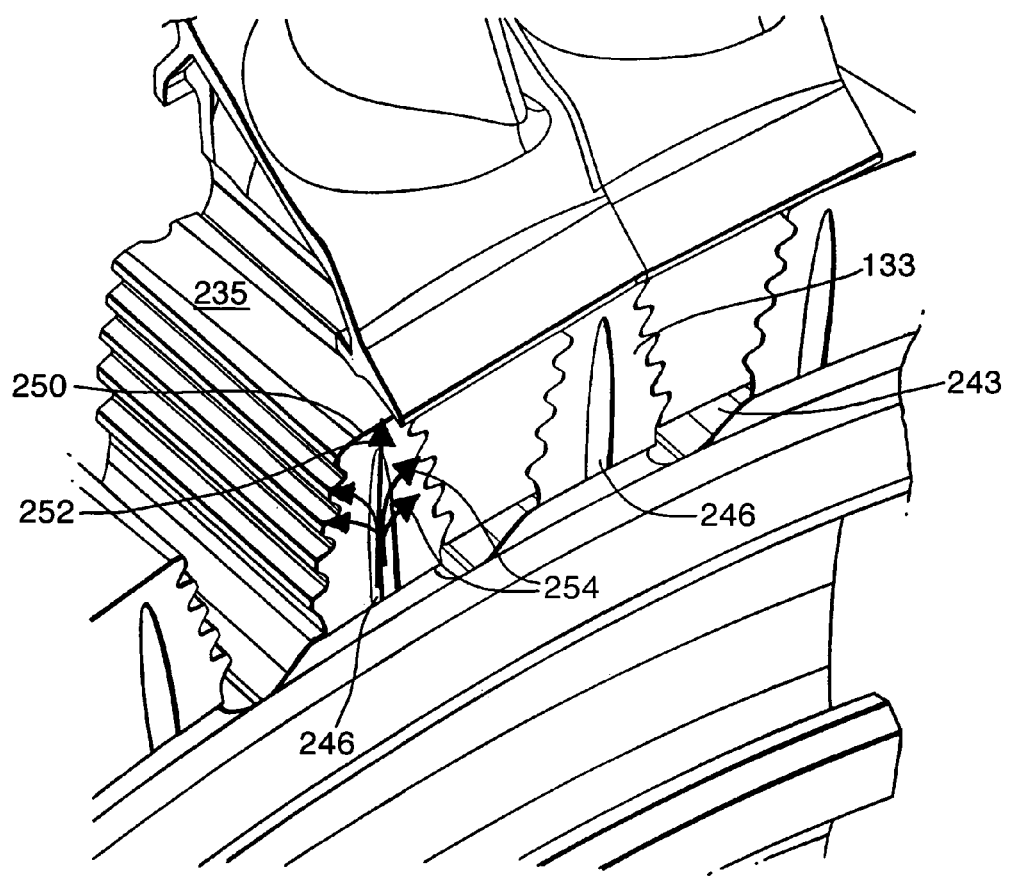

FIG. 6 is a front perspective view of a mounting arrangement in accordance with the present invention with the retainer cover plate removed, similar reference numerals have been used for consistency of description with respect to FIGS. 4 and 5. In accordance with the present invention entrainment slots or grooves 246 extend between the plenum indentation 240 (FIG. 5) upwards to the cavity 235 in order to create an air curtain which encapsulates and contains the coolant air within the cavity 235. In this embodiment, the grooves 246 are tapering, in depth and width, in the radially outward direction. FIG. 6 shows the grooves 246 terminating before breaking out of a radially outward edge 250 of the disc (post) 133, however, they may also break out of the radially outward edge 250.

The tapering grooves 246 are arranged such that they provide a wider distribution of cool air over the opening at the front of the blade shank cavity, so preventing the ingress of hotter lower quality air from the wheel space. This embodiment has the additional benefit of seeding the air adjacent to the disc/blade front surface (or open end 145) with cooler air from the groove 246. Thus arrow 252 shows the general direction of air flow being directed across the opening of the blade shank cavity 235 and arrows 254 show the general direction air flow spilling out of the groove 246 over the disc/blade front face or open end 145.

It should be appreciated by the skilled person that the groove 246 is configured to taper in cross-sectional area. Thus, without departing from the scope of the present invention, either the depth or the width of the groove 246 may be varied. In the preferred embodiment shown in FIG. 6, the groove 246 is defined by a part circular surface of constant radius, thus the groove 246 tapers both in depth and width. Furthermore, although an arcuate transverse profile of the groove is preferred, the groove may also be defined by two or more flat surfaces.

Although described as striations, grooves or slots it will be appreciated that the entrainment features provided in order to create the air curtain may take the form of pipes or conduits drilled beneath the surface of the rotor disc post, but clearly this would require a more complex fabrication process. Generally, the entrainment grooves or slots will be integral with the rotor disc post but may be formed by attached spacer strips or ribs secured or located relative to the surface as required for spacing from the retainer cover plate, but also to enable entrainment of the air flow in order to create the desired air curtain across the open end of the cavity.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A rotor disc assembly for a turbine engine, the rotor disc assembly comprising:
    (A) a plurality of blades secured to a rotor disc via disc posts and blade roots;
    (B) a blade pocket cavity defined between adjacent blades of the plurality of blades and radially outward of the disc post, wherein the cavity has an open end; and
    (C) a coolant plenum chamber defined within the rotor disc assembly,
    wherein the disc post comprises a surface including entrainment features that extend between and direct a curtain of coolant from the coolant plenum chamber across the open end and for coolant containment within the blade pocket cavity and for preventing hot air from entering the blade pocket cavity.

2. A rotor disc assembly as claimed in claim 1 wherein the entrainment features comprise striations or slots or grooves formed in the surface.

3. A rotor disc assembly as claimed in claim 1 wherein the entrainment features are integral with the surface.

4. A rotor disc assembly as claimed in claim 1 further comprising a retainer cover plate that defines the coolant plenum chamber with the rotor disc.

5. A rotor disc assembly as claimed in claim 1 wherein the entrainment features are angled to utilize rotary effects present in operation.

6. A rotor disc assembly as claimed in claim 1 wherein the cavity includes bleed apertures to facilitate throughput of coolant air flows within the cavity.

7. A rotor disc assembly as claimed in claim 6 wherein the bleed apertures are at an opposite end of the cavity to the open end in order to draw the air curtain flow as a coolant air flow across a cavity surface therebetween.

8. A rotor disc assembly as claimed in claim 7 wherein the bleed apertures are configured and/or positioned in order to utilise through rotational force evacuation throughput of air flows through the cavity for cooling effect.

9. A rotor disc assembly as claimed in claim 6 wherein the bleed apertures are configured and/or positioned in order to utilise through rotational force evacuation throughput of air flows through the cavity for cooling effect.

10. A rotor disc assembly as claimed in claim 1 wherein the entrainment features are tapered in a radially outward direction.

11. A rotor disc assembly as claimed in claim 1 wherein the entrainment features are part circular in cross-section.

12. A rotor disc assembly as claimed in claim 1 wherein the entrainment features are defined by at least two substantially flat surfaces.

13. A rotor disc assembly as claimed in claim 1 wherein the entrainment features extend to the radially outer edge of the surface.

14. A turbine engine incorporating a rotor disc assembly as claimed in claim 1.

15. A rotor disc assembly as claimed in claim 1 wherein a root gallery is defined radially inwardly of the blades and is in communication with the coolant plenum chamber and receives coolant therefrom.

16. A rotor disc assembly for a turbine engine, the rotor disc assembly comprising:
   (A) a plurality of blades secured to a rotor disc via disc posts and blade roots;
   (B) a blade pocket cavity defined between adjacent blades of the plurality of blades and radially outward of the disc post, wherein the cavity has an open end; and
   (C) a coolant plenum chamber defined within the rotor disc assembly,
   wherein the disc post comprises a surface including entrainment features that extend between and direct a curtain of coolant from the coolant plenum chamber and across the open end and for coolant containment within the blade pocket cavity, and the surface is part of a wheel space to one side of the rotor disc assembly.

17. A rotor disc assembly for a turbine engine, the rotor disc assembly comprising:
   (A) a plurality of blades secured to a rotor disc via disc posts and blade roots;
   (B) a blade pocket cavity defined between adjacent blades of the plurality of blades and radially outward of the disc post, wherein the cavity has an open end; and
   (C) a coolant plenum chamber defined within the rotor disc assembly,
   wherein the disc post comprises a surface including entrainment features that extend between and direct a curtain of coolant from the coolant plenum chamber and across the open end and for coolant containment within the blade pocket cavity, and the entrainment features do not extend to the radially outer edge of the surface.

* * * * *